Nov. 29, 1938.   A. L. PRENTICE   2,138,196
BRAKE SHOE KEY
Filed March 20, 1936   2 Sheets-Sheet 1
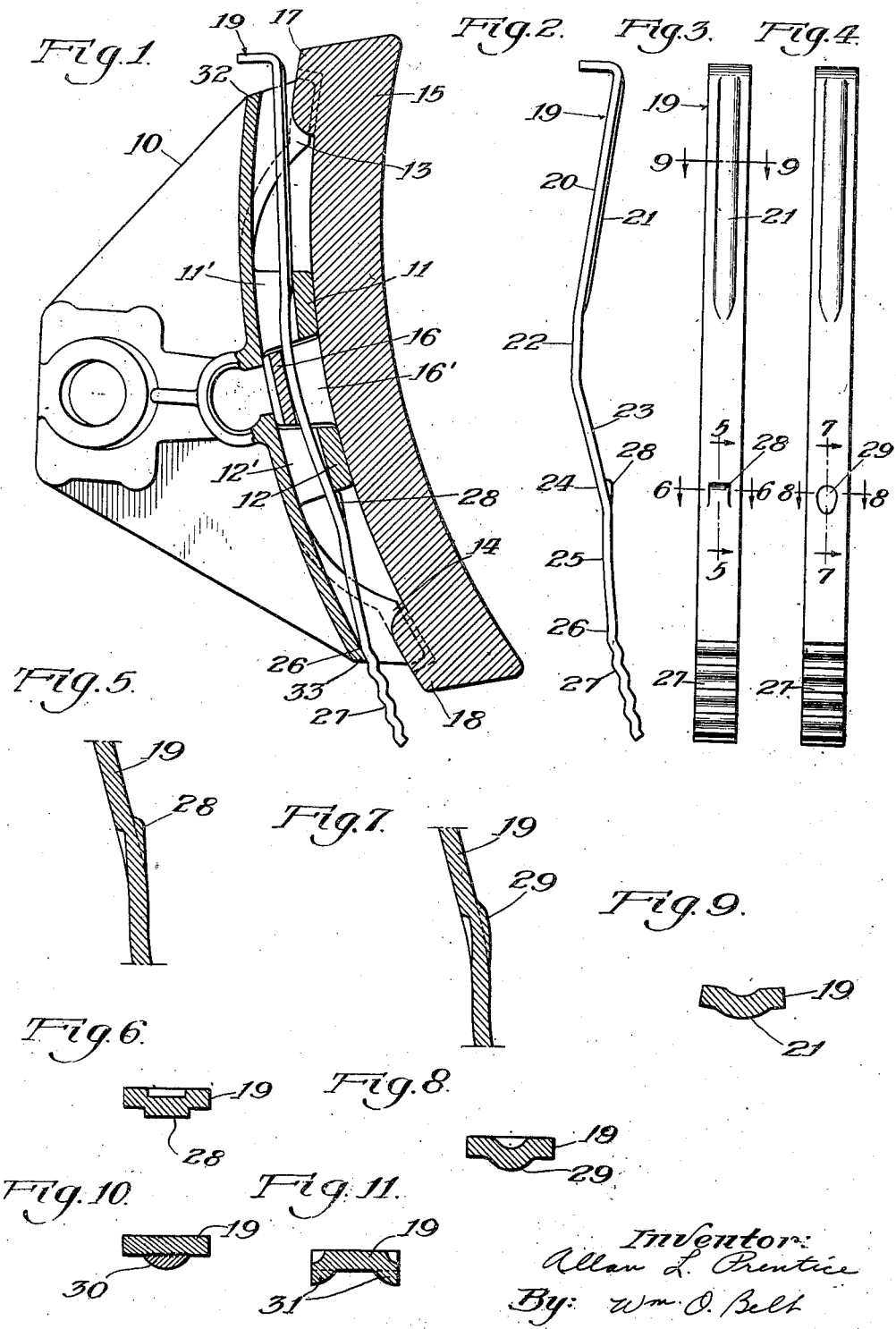

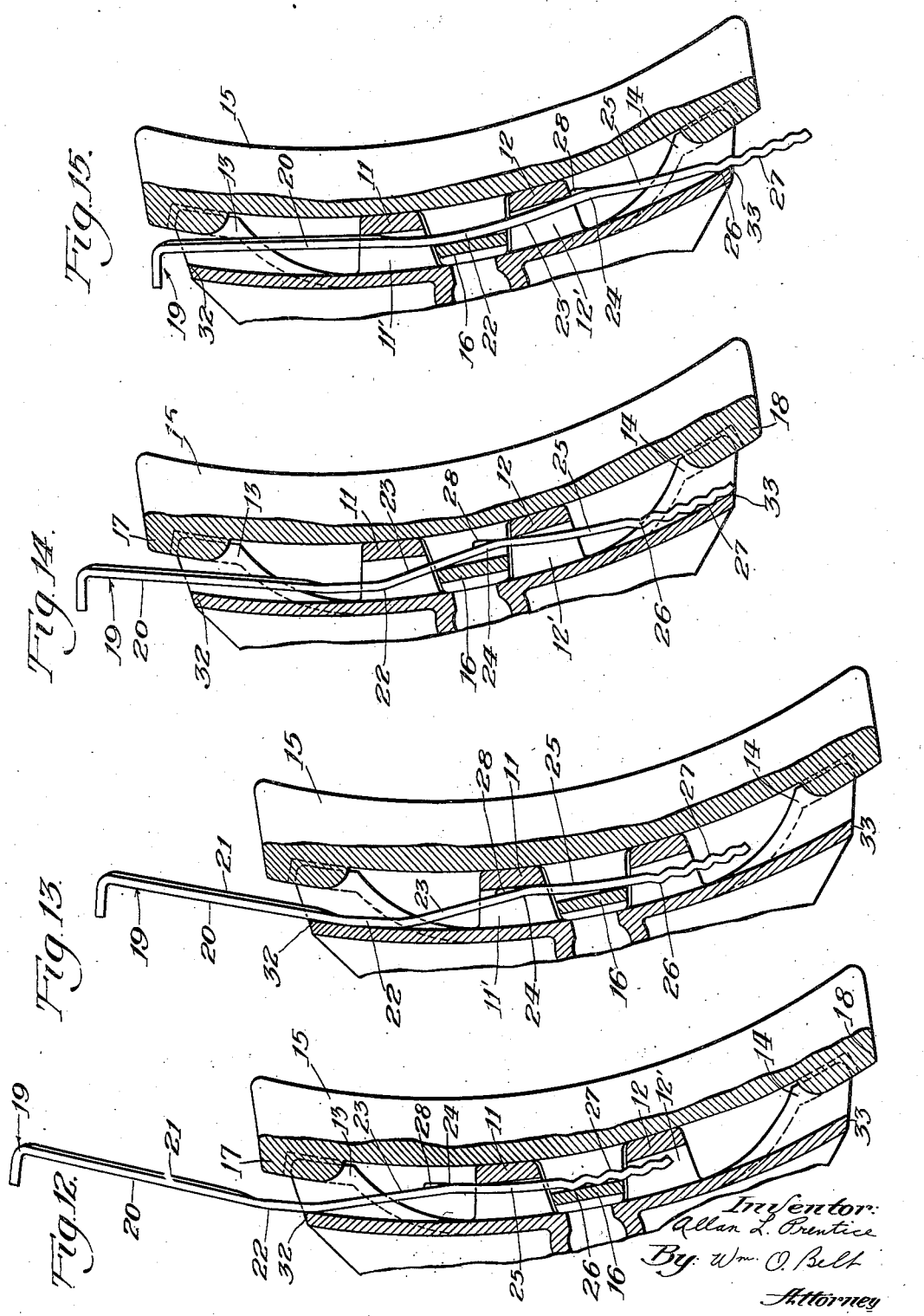

Patented Nov. 29, 1938

2,138,196

UNITED STATES PATENT OFFICE 2,138,196

BRAKE SHOE KEY

Allan L. Prentice, Cleveland, Ohio, assignor to The American Brake Shoe and Foundry Company, Wilmington, Del., a corporation of Delaware Application March 20, 1936, Serial No. 69,906

6 Claims. (Cl. 188—243)

This invention is an improvement upon my key for securing a brake shoe to a brake head set forth in United States Letters Patent 1,886,734, patented November 8, 1932.

The principal object of the invention is to provide a strong, substantial spring steel key of novel form which will tightly hold a new or an old shoe to a new or an old head and reduce the wear between and prolong the life of the parts, and to lock the key in the keyway of the shoe and head to prevent accidental displacement.

Another object is to provide the key on one face with a boss for engagement with the head, said boss being of less width than the width of the key and stamped up or otherwise formed thereon.

A further object is to stamp up the boss on one face of the key within its marginal side edges so as not to reduce the strength or flexibility of the key for its intended use but so as to increase the thickness of the key at the part whereat the boss is provided.

And a further object is to insure the retention of the key in locking position by providing for locking engagement of the key on opposite faces thereof with different parts of the head under the spring pressure of the key exerted in opposite directions.

In the accompanying drawings illustrating selected embodiments of the invention

Fig. 1 is an elevation partly in section showing a key embodying my invention and securing a shoe in a brake head;

Fig. 2 is an edge view of the key;

Fig. 3 is a front elevation of a key having a square type boss;

Fig. 4 is a front elevation of a key having an oval type boss;

Figs. 5 and 6 are sectional views on the lines 5—5 and 6—6 respectively of Fig. 3;

Figs. 7 and 8 are sectional views on the lines 7—7 and 8—8 respectively of Fig. 4;

Fig. 9 is a transverse sectional view on the line 9—9 of Fig. 3;

Figs. 10 and 11 are detail sectional views showing different kinds of bosses; and Figs. 12-15 inclusive diagrammatically illustrate the several steps of the operation of seating the key in the keyway.

Referring to the drawings, 10 is a brake head having lugs or pads 11, 12 and toes 13, 14; and 15 is a brake shoe having an attaching lug 16 and end lugs 17, 18. The lugs 11, 12 of the head have openings 11', 12', and the attaching lug 16 has an opening 16', and these openings form a keyway to receive the key 19. The key is made of flat spring steel of proper length and width to fit the head and shoe and of sufficient thickness to provide the necessary strength.

Referring to Figs. 2 and 3, the key has a straight upper section 20 which is preferably provided with a strengthening longitudinal flute or reenforce 21. The lower end of the upper straight section 20 merges in a rearward bend 22 which merges at its lower end in a straight section 23 which in turn merges in a relatively sharp forward bend 24 followed by a slight rearward bent section 25 which merges in a rearward bend 26 followed by a forwardly bent notched end portion 27.

At the bend 24 between the straight section 23 and the slightly curved section 25 I provide the key with a boss on its front face preferably by indenting the key at the back and pressing up the metal at the front whereby the thickness of the key is increased at the place whereat the boss is formed. The boss may be in substantially rectangular form 28 or in substantially oval form 29 or in any other suitable form. The boss is of less width than the width of the key and is also preferably located wholly within the side edges of the key, the metal being merely displaced in forming the boss. The boss may be welded on the key as shown at 30, Fig. 10, or it may be stamped up in two parts 31, 31 spaced apart and located, if desired, at the side edges of the key, Fig. 11. The key is not weakened by the boss but retains its resiliency and has all the strength required for long continued use to hold a shoe snugly and securely in a brake head in full compliance with installation and maintenance requirements. In any event, however, the boss increases the thickness of the key at the place where the boss is provided.

The invention provides a key which can be easily inserted and easily removed, which will hold the shoe snugly in the head and reduce vibration wear of the engaging parts to a minimum, and which will interlock with the head to prevent accidental displacement of the key under all conditions of use and whether the car is in normal upright position for travel or is turned upside down for dumping.

In practice, referring particularly to Figs. 12-15 inclusive, the shoe is applied to the head and the key is inserted at the top of the keyway. The key is bowed rearwardly from its head to its lower end and to a substantial degree and the most prominent part of this bend is substantially midway of the length of the key, or at least it is midway of that part of the key which is located within the keyway when the key has been driven home. While the lower part of the key from the central bend 22 to the notched lower end is slightly bent, it is sufficiently straight to permit the key to drop by gravity for a considerable distance in the keyway when the shoe has been applied to the head and the key has been entered in the upper end of the keyway, Fig. 12. In a new shoe and head the key will drop by gravity until the back of the key at the central bend 22 is bearing against the top of the head and the upper part of the section 25 or the lower part of the bend 24 is bearing against the lug or pad 11 of the head and the bend 26 is bearing against the shoe lug 16. This engagement of the key in the keyway is sufficient to hold the shoe in the head until the key is driven home in the keyway. Under a comparatively light blow or blows on the head of the key it will move down the keyway into the position shown in Fig. 13, the bend 22 sliding on the head below 32, the bend 24 sliding on the head lug 11, and the bend 26 sliding down and below the lug 16. In this position the key is fairly tight in the keyway but it offers little resistance and it can be driven into and out of this position with light hammer blows. On continued downward movement of the key from the position shown in Fig. 13 it becomes loose in the keyway and drops by gravity to the position shown in Fig. 14, the upper straight section of the key being free in the keyway, the straight section 23 bearing on the upper edge of the shoe lug 16, the bend 24 bearing on the upper part of the head lug 12, and the lower notched portion bearing upon the lower end of the head at 33. In this position, Fig. 14, the key can be moved freely up and down in the keyway; light blows would be required to move it from the position shown in Fig. 13 to the position shown in Fig. 12 for removal, but very heavy blows are required for driving the key home from the position shown in Fig. 14 to that shown in Fig. 15 for the key is under its greatest tension when the boss is engaging the head lug 12. When the key attains the position shown in Fig. 15, the bend 22 is engaging the shoe lug 16, the upper part of the bend 24 is engaging the head lug 12, with the boss 28 below said lug, and the bend 26 is engaging the head at 33. In this position the key is held in the keyway under considerable tension, usually sufficient under all usual conditions for permanently securing the shoe in the head, and the boss is located below the lug 12 and the lower end of the head is engaged with a notch in the lower end of the key to provide a safety lock for securing the key against most contingencies. This combination lock of the key with the head at two spaced points is particularly important because the boss is maintained in proper locking position with respect to the lug 12 under the forward pressure of the key, toward the shoe, and the notch is maintained in proper locking position with respect to the lower end of the head under the rearward pressure of the key, toward the head. Thus the oppositely acting pressures of the key under tension in the keyway in conjunction with the double safety lock afforded by the boss and the notch in the key cooperating with parts of the head tend to insure a secure and permanent lock against accidental displacement of the key in or from the head. When the key is seated in the keyway as shown substantially in Figs. 1 and 15 it is under considerable tension at the central bend 22 where it functions effectively for holding the shoe snugly in the head, the adjacent portions of the key bearing upon the head lug 11 and upon the head lug 12, and the bend 26 bearing hard upon the lower end of the head. Thus the shoe is not only held snugly in the head to reduce relative vibration of the shoe and head and consequent wear of contacting parts, but the key is held securely in the keyway for locking all the parts together to prevent accidental separation under most conditions of use. Another important advantage of the present key is that if it should work upwardly after installation thereof the face of the boss 28 will ride onto the adjacent face of the lug 12. Then, by reason of the increased thickness of the key at the place where the boss is located, the tension of the key is increased and therefore force effecting engagement of the key with the head at the point 33 is increased, wherefore, instead of such upward movement of the key tending to free the shoe from the head, the shoe is even more firmly clamped to the head and displacement thereof is thereby effectively prevented.

A shoe is applied to a head in service under some difficulties because of the lack of room beneath the body of the car but my invention greatly facilitates this operation by providing that the key will drop by gravity in the keyway for a considerable portion of its length and sufficiently to hold the shoe in the head temporarily. Then the trainman can use his hammer to drive the key to its seat. The initial part of this drive requires a light blow, which can be easily applied, and then the key becomes loose and drops comparatively near its final seat, and so near that the head of the key is close to the top of the shoe and head leaving as much room as possible for the trainman to strike heavy blows upon the head with sufficient force to drive the key home. Thus the initial part of the operation of inserting the key can be performed without the use of hammer blows, the intermediate part of the operation is performed by light hammer blows not requiring a wide arc swing; and by this time the head of the key is down so far below the body of the car that the trainman is enabled to take wide arc swings with his hammer to apply the required force for driving the key to its seat. This final part of the operation of inserting the key requires considerable force to overcome the maximum resistance of the key, but it is performed under the best operating conditions and the movement of the key in this final part of the operation is short, approximately two inches. Thus my invention not only provides a rigid mounting for the shoe and a reliable lock for the key, but it also greatly facilitates and simplifies the operation of setting the key in the keyway, and likewise for removing the key from the keyway for the removal involves only a reversal of the setting operations under the same favorable conditions.

The boss and the notches do not obstruct or interfere with the movement of the key to its seat and while they are sufficient, for the reasons stated, to lock the key in the keyway against accidental displacement they will not prevent intentional removal of the key for replacing the shoe or other purposes. The boss is preferably located, as shown, just above the apex of the bend 24 because in the formation of the key the boss in this position will be located below the lug 12 to usually prevent upward movement of the key. This location of the boss has the further advantage that it requires comparatively little displacement of the metal, being formed just above the apex of the bend, so that the upper part of the boss is the highest part above the front face of the body of the key and from this highest part the boss gradually merges into the body of the key at or about the apex of the bend. Expressed differently, the boss tapers in thickness from top to bottom and merges at its bottom in the body of the key. It does not require a very wide boss to function in accordance with my invention and generally speaking I would say that the total width of the boss may not exceed one-half the width of the key. This is important because very little displacement of metal is required to make the boss 28, 29 or 31. Each of the bosses 28 and 29 is located wholly within and spaced from the side edges of the key and is of less width than the width of the key, and the welded boss 30 is likewise of less width than the width of the key. The two sections 31 forming the boss in Fig. 11 together are of less width than the width of the key. The object of the different bosses is to provide a safety stop formed out of or on the key without to any material degree reducing its strength or its resiliency but at the same time increasing its thickness at the place where the boss is provided.

I reserve the right to change the construction and arrangement of parts of my invention to adapt it for other shoes and heads, or for other reasons, within the scope of the following claims.

I claim:

1. A brake shoe key made of spring metal and having a general bow rearwardly between its head and its lower end, and rigid locking means spaced apart on the key to engage spaced opposing faces on spaced parts of a brake head and prevent accidental displacement of the key from the keyway of the head and shoe, one of said locking means projecting from the key to increase the thickness thereof and being adapted for cooperation with the part of the head engaged thereby to insure tight engagement of the other locking means with the head so as to increase the tension of the key in event of movement of said one locking means over the opposing face of the part of the head engaged thereby.

2. A brake shoe key made of spring metal and having a general bow rearwardly between its head and its lower end, and rigid locking means on the key to engage spaced opposing faces on spaced parts of a brake head and prevent accidental displacement of the key from the keyway of the head and shoe, one of said locking means being located on the front of the key and the other locking means being spaced below and located on the back of the key, the locking means located on the front of said key projecting from the key to increase the thickness thereof and being adapted for cooperation with the part of the head engaged thereby to insure tight engagement of the locking means located on the back of the key with the head in event of movement of the locking means on the front of the key over the opposing face of the part of the head engaged thereby.

3. A brake shoe key made of spring metal and having a general bow rearwardly between its head and its lower end, a rearward bend substantially at the middle of the key, a forward bend below the middle bend, and a rearward bend between the forward bend and the lower end of the shoe, said key having rigid locking means at said forward bend and at the lower rearward bend to engage spaced opposing faces on spaced parts of a brake head and prevent accidental displacement of the key from the keyway of the head and shoe, one of said locking means projecting from the key to increase the thickness thereof and being adapted for cooperation with the part of the head engaged thereby to insure tight engagement of the other locking means with the head so as to increase the tension of the key in event of movement of said one locking means over the opposing face of the part of the head engaged thereby.

4. A brake shoe key made of spring metal and having a general bow rearwardly between its head and its lower end, and locking means spaced apart on the key to engage spaced opposing faces on spaced parts of a brake head and prevent accidental displacement of the key from the keyway of the head and shoe, said locking means comprising a rigid boss on the front of the key and a notch on the back of the key, the boss on the front of the key projecting from the key to increase the thickness thereof and being adapted for cooperation with the part of the head engaged thereby to insure tight engagement of the notch on the back of the key with the head in event of movement of the boss over the opposing face of the part of the head engaged thereby.

5. A brake shoe key made of spring metal and having a general bow rearwardly between its head and its lower end, a rearward bend substantially at the middle of the key, a forward bend below the middle bend, and a rearward bend between the forward bend and the lower end of the key, and a rigid boss on the front of the key at the forward bend and a notch on the back of the key below the forward bend, said boss being arranged for engagement with one part of the head and said notch being arranged for engagement with another part of the head under pressure of the key in opposite directions when seated in the keyway of the brake head and shoe to prevent accidental displacement of the key, the boss on the front of the key projecting from the key to increase the thickness thereof and being adapted for cooperation with the part of the head engaged thereby to insure tight engagement of the notch on the back of the key with the head in event of movement of the boss over the opposing face of the part of the head engaged thereby.

6. A brake shoe key made of spring metal and having a general bow rearwardly between its head and its lower end, a rear bend substantially at the middle of the key, a forward bend below the middle bend, a rearward bend between the forward bend and the lower end of the key, and a rigid boss on the front of the key to increase the thickness thereof at the forward bend and projecting therefrom to cooperate with a lug on the head with which said key is adapted to be used.

ALLAN L. PRENTICE.